United States Patent
Du et al.

(10) Patent No.: US 12,042,091 B2
(45) Date of Patent: Jul. 23, 2024

(54) ELECTRIC ROASTING MACHINE

(71) Applicant: FOSHAN SHUNDE MIDEA ELECTRICAL HEATING APPLIANCES MANUFACTURING CO., LTD., Foshan (CN)

(72) Inventors: Jianrong Du, Foshan (CN); Guoyao Zhao, Foshan (CN); Minghui Du, Foshan (CN); Jiequan Huang, Foshan (CN); Yan She, Foshan (CN); Yuhua Huang, Foshan (CN); Pingying Han, Foshan (CN); Xiubao Lin, Foshan (CN); Wenxiu Zhou, Foshan (CN); Haitao Li, Foshan (CN); Gang Wang, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 1338 days.

(21) Appl. No.: 16/343,371

(22) PCT Filed: Jul. 4, 2017

(86) PCT No.: PCT/CN2017/091717
§ 371 (c)(1),
(2) Date: Apr. 18, 2019

(87) PCT Pub. No.: WO2018/072476
PCT Pub. Date: Apr. 26, 2018

(65) Prior Publication Data
US 2019/0246836 A1 Aug. 15, 2019

(30) Foreign Application Priority Data

Oct. 18, 2016 (CN) .......................... 201610909459.2
Oct. 18, 2016 (CN) .......................... 201621134203.0
(Continued)

(51) Int. Cl.
*A47J 37/06* (2006.01)
*H05B 3/00* (2006.01)

(52) U.S. Cl.
CPC ........... *A47J 37/0641* (2013.01); *A47J 37/06* (2013.01); *A47J 37/0635* (2013.01);
(Continued)

(58) Field of Classification Search
CPC ............... A47J 37/0629; A47J 37/6635; A47J 37/0641; A47J 37/0709
(Continued)

(56) References Cited

U.S. PATENT DOCUMENTS 6,899,019 B2  5/2005  Han et al.
2004/0069150 A1  4/2004  Han et al.
(Continued)

FOREIGN PATENT DOCUMENTS

AU  2003213336 A1  9/2003
CN  1488309 A  4/2004
(Continued)

OTHER PUBLICATIONS

Machine Translation of KR1020110040988 (Year: 2023).*
(Continued)

*Primary Examiner* — Nathaniel E Wiehe
*Assistant Examiner* — Thomas J Ward
(74) *Attorney, Agent, or Firm* — Anova Law Group, PLLC (57) ABSTRACT

An electric roasting machine includes a housing defining a cavity having an upper opening, a heating device installed in
(Continued)

the cavity, and a grill located at the opening of the cavity. The grill includes a carrying part extending into the cavity and located in a region covered by thermal radiation of the heating device.

20 Claims, 8 Drawing Sheets

(30) Foreign Application Priority Data

| Oct. 18, 2016 | (CN) | ........................ 201621134526.X |
| Oct. 18, 2016 | (CN) | ........................ 201621134564.5 |
| Oct. 18, 2016 | (CN) | ........................ 201621135969.0 |
| Oct. 18, 2016 | (CN) | ........................ 201621136024.0 |
| Oct. 18, 2016 | (CN) | ........................ 201621136025.5 |
| Oct. 18, 2016 | (CN) | ........................ 201621137758.0 |
| Apr. 18, 2017 | (CN) | ........................ 201720411087.0 |

(52) U.S. Cl.
CPC ........ *A47J 37/0664* (2013.01); *H05B 3/0076* (2013.01); *H05B 2203/032* (2013.01)

(58) Field of Classification Search
USPC ............ 219/450, 1.1, 449.1, 452.11, 452.12; 99/339, 358, 376
See application file for complete search history.

(56) References Cited

U.S. PATENT DOCUMENTS

| 2004/0154609 | A1* | 8/2004 | Han | .................... A47J 37/0709 |
| | | | | 126/41 R |
| 2006/0151471 | A1* | 7/2006 | Jang | .................... A47J 37/0709 |
| | | | | 219/450.1 |
| 2011/0084057 | A1* | 4/2011 | Lin | .................... A47J 37/0709 |
| | | | | 219/450.1 |
| 2016/0227964 | A1 | 8/2016 | Van et al. | |

FOREIGN PATENT DOCUMENTS

| CN | 1518941 | A | | 8/2004 | | |
| CN | 101480319 | A | | 7/2009 | | |
| CN | 101493236 | A | | 7/2009 | | |
| CN | 201641677 | U | | 11/2010 | | |
| CN | 202723634 | U | | 2/2013 | | |
| CN | 203506455 | U | | 4/2014 | | |
| CN | 203586320 | U | | 5/2014 | | |
| CN | 204105778 | U | | 1/2015 | | |
| CN | M511213 | U | * | 11/2015 | ............... | A21B 1/00 |
| CN | 204995249 | U | | 1/2016 | | |
| CN | 105578935 | A | | 5/2016 | | |
| CN | 105578936 | A | | 5/2016 | | |
| CN | 105578936 | A | * | 5/2016 | .......... | A47J 37/0709 |
| CN | 206102455 | U | | 4/2017 | | |
| CN | 206284929 | U | | 6/2017 | | |
| CN | 206284930 | U | | 6/2017 | | |
| CN | 206284931 | U | | 6/2017 | | |
| CN | 206284932 | U | | 6/2017 | | |
| CN | 206284933 | U | | 6/2017 | | |
| CN | 206284934 | U | | 6/2017 | | |
| CN | 206333783 | U | | 7/2017 | | |
| CN | 206354919 | U | | 7/2017 | | |
| CN | 206354920 | U | | 7/2017 | | |
| CN | 206462871 | U | | 9/2017 | | |
| CN | 206462872 | U | | 9/2017 | | |
| JP | 2002340345 | A | | 11/2002 | | |
| KR | 1020110040988 | | * | 4/2011 | ............... | H05B 3/14 |
| KR | 20120058944 | A | | 6/2012 | | |
| KR | 20120122685 | A | | 11/2012 | | |
| KR | 20150019454 | A | | 2/2015 | | |

OTHER PUBLICATIONS

Machine Translation of CN105578936A (Year: 2023).*
Machine Translation of TWM511213U; (Year: 2023).*
World Intellectual Property Organization (WIPO) Written Opinion for PCT/CN2017/091714 with translation Oct. 13, 2017 9 Pages.
World Intellectual Property Organization (WIPO) Written Opinion for PCT/CN2017/091717 with translation Oct. 13, 2017 9 Pages.
World Intellectual Property Organization (WIPO) International Search Report PCT/CN2017/091714 Oct. 13, 2017 8 Pages.
World Intellectual Property Organization (WIPO) International Search Report PCT/CN2017/091717 Oct. 13, 2017 8 Pages.
The China National Intellectual Property Administration (CNIPA) The First Office Action for Chinese Application 201610909459.2 May 20, 2023 15 Pages (With Translation).
The China National Intellectual Property Administration (CNIPA) The First Office Action for Chinese Application 201610910148.8 May 11, 2023 15 Pages (With Translation).

* cited by examiner

ELECTRIC ROASTING MACHINE

CROSS-REFERENCE TO RELATED APPLICATIONS

This application is a National Stage Entry under 35 U.S.C. § 371 of International Application No. PCT/CN2017/091717, filed on Jul. 4, 2017, which claims priority to Chinese Application Nos. 201621134203.0, 201621136025.5, 201621134526.X, 201621134564.5, 201621136024.0, 201610909459.2, 201621137758.0, and 201621135969.0, all filed on Oct. 18, 2016, and to Chinese Application No. 201720411087.0, filed on Apr. 18, 2017, the entire contents of all of which are incorporated herein by reference. No new matter is added.

TECHNICAL FIELD

The present disclosure generally relates to the technical field of cooking utensil, and more particularly relates to an electric roasting machine.

BACKGROUND

Electric roasting machine roasts foods contactlessly by thermal radiation, in which the foods roasted would not be burnt, and are fresh and tender. Beyond that, less cooking fume is generated during roasting. Therefore, the electric roasting machine is the favorite of consumers.

At present, during roasting, only the side of the food that faces towards the electric roasting machine can be heated, resulting in low heating efficiency and low heat utilization rate.

SUMMARY

It is therefore one main objective of the disclosure to provide an electric roasting machine, aiming to achieve that the food can be roasted in different directions at the same time, and to improve the heating efficiency and the heat utilization rate of the electric roasting machine.

In order to realize the above objective, the electric roasting machine provided by the present disclosure includes a housing, a heating device, and a grill;
   the housing encloses a cavity which has an upper opening;
   the heating device is installed in the cavity; and
   the grill is located at the opening of the cavity, the grill includes a carrying part extending into the cavity and close to the heating device, and the carrying part is located in the region that thermal radiation of the heating device covers.

In one exemplary embodiment, a vertical distance of the carrying part from the opening is in a range of 30 millimeters to 150 millimeters.

In one exemplary embodiment, the housing and the heating device cooperatively form an air passage, a wall of the air passage is provided with an air outlet communicated with the air passage, and the plane where the carrying part is located is lower than the air outlet.

In one exemplary embodiment, the housing includes an inner housing and an outer housing sleeved on the inner housing, the heating device is installed in the inner housing, the inner housing and the heating device cooperatively form the air passage, the top end of the air passage is closed, and the side of the air passage near the cavity is provided with the air outlet.

In one exemplary embodiment, the inner housing bends inwards to form the air passage together with the heating device, and the inner housing is provided with a plurality of air outlets linearly arranged above each heating device.

In one exemplary embodiment, the plurality of air outlets are in the same horizontal plane.

In one exemplary embodiment, the inner housing includes a supporting part for supporting the grill at the opening of the cavity, and an upper end surface of the supporting part is higher than that of the outer housing.

In one exemplary embodiment, there are a plurality of supporting parts, the supporting parts are arranged at intervals and surround the opening of the cavity, and each two adjacent supporting parts define one airflow channel therebetween.

In one exemplary embodiment, the housing further includes a bottom housing, the bottom housing is connected to the lower ends of the outer housing and the inner housing, the bottom housing includes an air inlet, and the bottom of the inner housing is provided with a through hole communicating with the air passage and the air inlet.

In one exemplary embodiment, an electric fan is arranged between the air inlet and the through hole.

In one exemplary embodiment, the electric roasting machine further comprises an oil drip pan provided at the bottom housing, at least one end of the oil drip pan includes a concave oil receiving groove, a length of a projection of the oil drip pan on the horizontal plane is greater than that of the heating device, and an orthographic projection of the oil receiving groove is located outside an area of an orthographic projection of the heating device.

In one exemplary embodiment, the middle of the oil drip pan protrudes to form two inclined surfaces extending from the middle to two ends of the oil drip pan, respectively, and each inclined surface is coupled to one oil receiving groove.

In one exemplary embodiment, there are two heating devices, the two heating devices are located in the cavity and opposite to each other, and each heating device extends along the length direction of the inner housing.

In one exemplary embodiment, the heating device includes a reflecting cover and a radiant heat source mounted at the reflecting cover, the reflecting cover is connected to the inner housing, and a distance between the carrying part and the radiant heat source is smaller than the distance between the top end of the reflecting cover and the carrying part.

In one exemplary embodiment, a ratio of a vertical distance between the carrying part and the lower end of the reflecting cover to the height of the reflecting cover is in a range from 0.1 to 0.9.

In one exemplary embodiment, the carrying part includes a plurality of grid bars arranged at intervals, and each grid bar has a width greater than 5 millimeters, and less than or equal to 10 millimeters.

In one exemplary embodiment, a ratio of the width of each grid bar to the distance between two adjacent grid bars ranges from 1 to 10.

In one exemplary embodiment, the thickness of each grid bar ranges from 1 millimeter to 6 millimeters.

In one exemplary embodiment, the reflecting cover defines a reflecting cavity, the radiant heat source is located in the reflecting cavity, the reflecting cavity includes an avoiding opening, the heating device further includes a protecting window which is configured to cover the avoiding opening, and the protecting window is configured to cover the avoiding opening to enclose an closed space together with the reflecting cover.

In one exemplary embodiment, the protecting window is configured to vertically extend along the up-down direction;

or, the protecting window is configured to extend obliquely along a direction from the lower end of the housing to the upper end of the housing and tilting towards the center point of the opening of the cavity.

In one exemplary embodiment, for the obliquely-extending protecting window, an angle α between the protecting window and the normal line of the horizontal plane is greater than 0 degree, and less than or equal to 20 degree.

In one exemplary embodiment, an orthographic projection of the protecting window on the horizontal plane is configured to be not overlapping with the orthographic projection of the carrying part on the horizontal plane.

In one exemplary embodiment, the protecting window is a curved plate, and the curved plate protrudes towards the grill.

In one exemplary embodiment, the curved plate is formed by a single curved plate, a curve radius of the single curved plate is in a range of 30 millimeters to 120 millimeters, or the curved plate is formed by interconnecting a plurality of sections of curved plates having different curve radii.

According to the technical solution of the present disclosure, the housing of the electric roasting machine includes the cavity, the heating device is installed in the cavity, and the carrying part of the grill for containing food materials is sunk in the cavity, the carrying part in the cavity is located in the region that thermal radiation of the heating device covers, so that the heat generated by the heating device can be used for heating the upper surface, the side surfaces, and the lower surface of the food material on the carrying part of the grill at the same time. Compared with the technical solution of the existing electric roasting machine that only the side of the food facing towards the current electric is heated, the heating efficiency and the heat utilization rate of the electric roasting machine of the present disclosure are greatly improved.

BRIEF DESCRIPTION OF THE DRAWINGS

To better illustrate the technical solutions that are reflected in various embodiments according to this disclosure or that are found in the existing technologies, the accompanying drawings for the description of the embodiments herein or for the existing technologies are briefly described below. It is evident that the accompanying drawings listed in the following description show merely some embodiments according to this disclosure, and that those having ordinary skill in the art may be able to obtain other drawings based on the arrangements shown in these drawings without making creative efforts.

EXPLANATION OF REFERENCE NUMERALS

| Reference numeral | Name | Reference numeral | Name |
| --- | --- | --- | --- |
| 100 | electric roasting machine | 51 | reflecting cover |
| 10 | housing | 53 | radiant heat source |
| 20 | air passage | 55 | reflecting cavity |
| 22 | air inlet | 57 | protecting window |
| 24 | air outlet | 70 | grill |
| 26 | through hole | 71 | carrying part |
| 30 | inner housing | 80 | bottom housing |
| 31 | cavity | 90 | oil drip pan |
| 40 | electric fan | 91 | oil receiving groove |
| 50 | heating device | | |

The realization of the objectives, functional characteristics, advantages of the present disclosure are further described specifically with reference to the accompanying drawings and embodiments.

DETAILED DESCRIPTION

The technical solutions of the embodiments of the present disclosure are clearly and completely described in the following with reference to the accompanying drawings. It is obvious that the embodiments to be described are only some rather than all of the embodiments of the present disclosure. All other embodiments obtained by persons skilled in the art based on the embodiments of the present invention without creative efforts shall fall within the protection scope of the present invention.

It is to be understood that, all of the directional terms (such as top, down, left, right, front, back . . . ) in the exemplary embodiments of the present disclosure are only intended for explaining relative position relations, moving condition of the elements at a specific attitude (referring to figures), and so on. If the specific attitude changes, the directional term changes accordingly.

In the present disclosure, terms such as "connect" and "fix" should be understood in a broad sense, unless otherwise prescribed or defined explicitly. For example, the term "[fix] connect," unless otherwise specified, can refer to a fixed connection, a removable connection, or an integral connection, can refer to a mechanical connection or an electrical connection, and can also refer to a direct connection, an indirect connection via an intermediary, or an internal communication between two components or an interaction between two components. A person having ordinary skills in the art can understand specific meanings of the above terms in the present disclosure according to specific situations.

In addition, the descriptions associated with, e.g., "first", "second", etc., in the exemplary embodiments of present disclosure, are only intended for descriptive purposes, and should not be understood as indicating or suggesting relative importance or impliedly indicating the number of the indicated technical character. Therefore, the character indicated by "first", "second" can express or impliedly include at least one such character. In addition, the technical solutions of various exemplary embodiments can be combined with each other, but such combination shall be realizable by those having ordinary skill in the art. When conflict occurs in a combination of the technical solutions or a combination cannot be realized, it should be considered that such combination does not exist, and is not within the protection scope of the claims of the application.

The present disclosure provides an electric roasting machine.

Referring to FIGS. 1 to 4, in one exemplary embodiment of the present disclosure, the electric roasting machine 100 includes a housing (not labelled), a heating device 50, and a grill 70. The housing forms a cavity 31 which has an upper opening, the heating device 50 is installed in the cavity 31, the housing and the heating device 50 cooperatively enclose an air passage 20, and a wall of the cavity 31 of the housing includes a plurality of air outlets 24 communicating with the air passage 20. The grill 70 is located at the opening of the cavity 31 and partially extends into the cavity 31. The grill 70 includes a carrying part 71 which extends into the cavity 31 and is close to the heating device 50, and the carrying part 71 is located in the region that thermal radiation of the heating device 50 covers.

The housing of the present disclosure includes an inner housing 30 and an outer housing 10 sleeved outside the inner housing 30, the outer housing 10 is made of plastic and manufactured by an integral injection molding method. The inner housing 30 may be made of stainless steel or aluminum alloy. The arrangement of the plastic housing 10 can reduce the temperature of the outer surface of the electric roasting machine 100 when in use, and can prevent scalding. The outer housing 10 has a cover body shape which has a rectangular cross section, the upper and lower ends of outer housing 10 are both provided with opening, and the inner housing 30 and the heating device 50 are both arranged in the space enclosed by the outer housing 10. The inner housing 30 also has a cover body shape which has a rectangular cross section, and the inner housing 30 matches the outer housing 10 in shape. The cavity 31 is formed in the middle of the inner housing 30. The inner housing 30 may be formed by a plurality of metal plates joined end to end. The electric roasting machine 100 of the present disclosure includes a bottom housing 80 connected with the bottoms of the outer housing 10 and the inner housing 30, an oil drip pan 90 is slidably connected with the bottom housing 80, and the grill 70 is located at the upper end of the inner housing 30, the heating device 50 is installed in the inner housing 30, and the inner housing 30 and the heating device 50 cooperatively form the air passage 20. During use of the electric roasting machine 100, the grill 70 is located at the opening of the cavity 31 and supported by the inner housing 30. In the process of heating food materials, such as meat, oil droplets generated during the heating process can fall down and drip onto the oil drip pan 90, and of course, moisture carried by food materials can also drop onto the oil drip pan 90 to be collected by the oil drip pan 90. As the oil drip pan 90 is slidably connected with the bottom housing 80, the oil drip pan 90 can be pulled out from one side of the electric roasting machine 100, so that the oil stain on the oil drip pan 90 can be cleaned conveniently.

According to the technical solution of the present disclosure, the housing of the electric roasting machine 100 includes the cavity 31, the heating device 50 is installed in the cavity 31, and the carrying part 71 of the grill 70 for containing food materials is sunk in the cavity 31, and the carrying part 71 is located in a region in the cavity 31 that thermal radiation of the heating device 50 covers, so that the heat generated by the heating device 50 can be used for heating the upper surface, the side surfaces, and the lower surface of the food material on the carrying part 71 of the grill 70 at the same time. Compared with the technical solution of the existing electric roasting machine that only the lower surface of the food material on the grill is heated, the electric roasting machine 100 of the present has improved heating efficiency and higher heat utilization rate.

Figure 1:
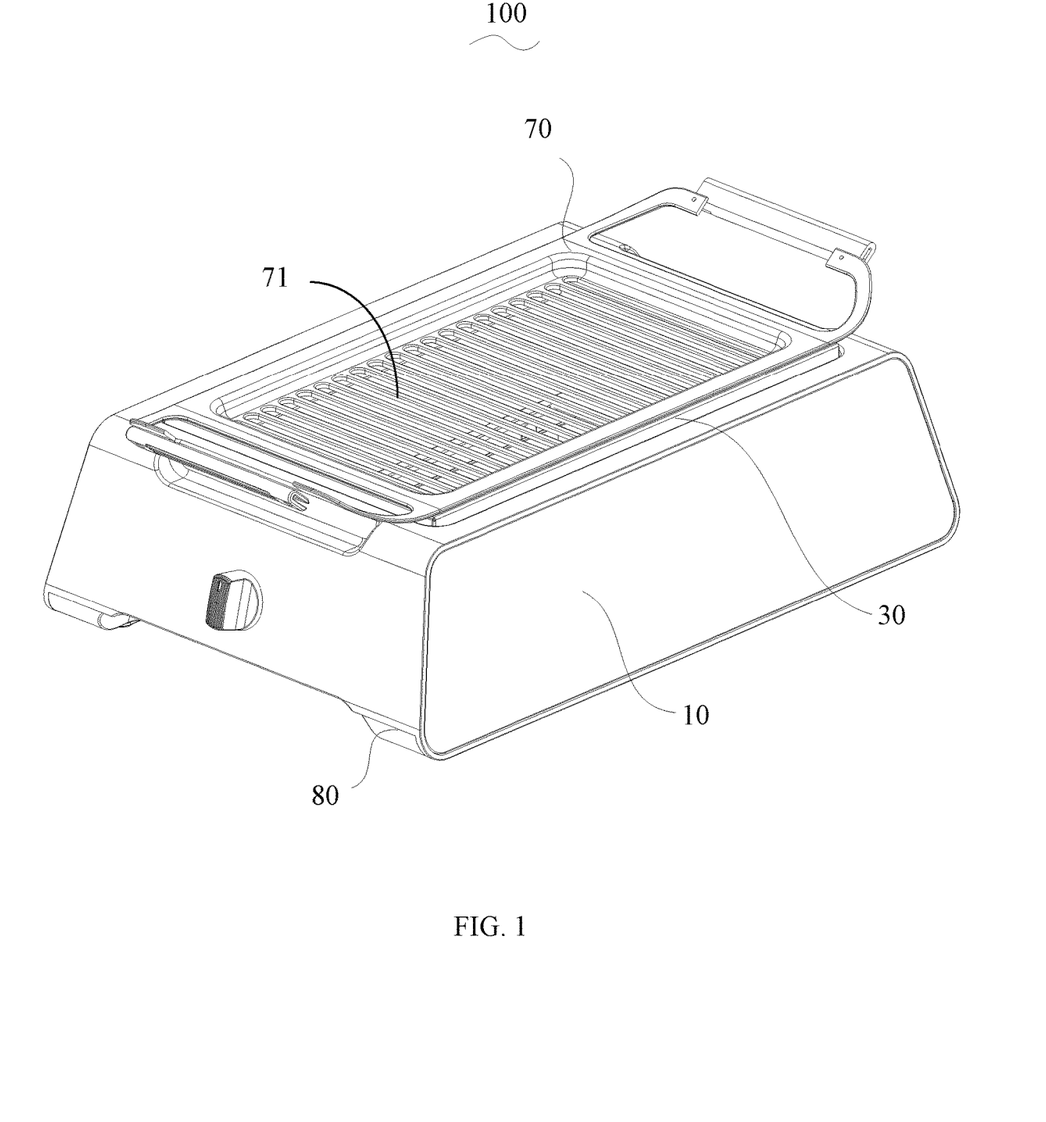
FIG. 1 is a structural diagram of the electric roasting machine of the present disclosure according to a first exemplary embodiment.
Figure 2:
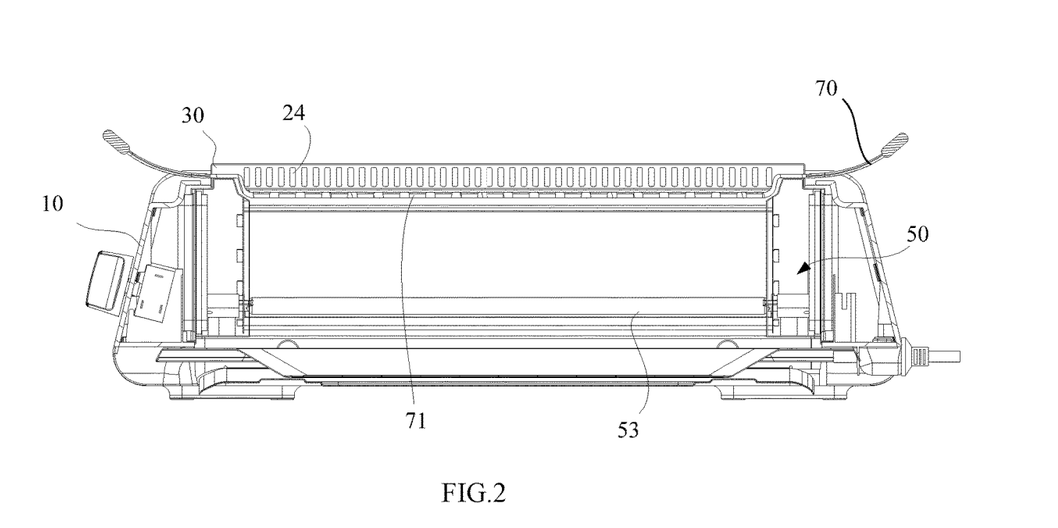
FIG. 2 is a longitudinal sectional diagram of the electric roasting machine shown in FIG. 1, with the grill in an installed state.
Figure 3:
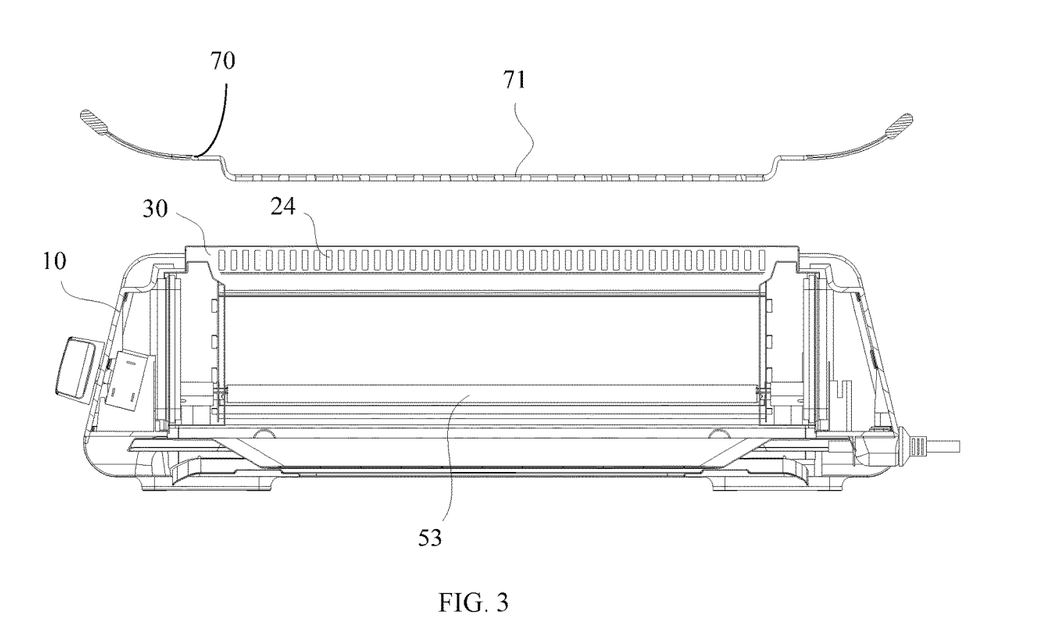
FIG. 3 is a longitudinal sectional diagram of the electric roasting machine shown in FIG. 1, with the grill in an uninstalled state.
Figure 4:
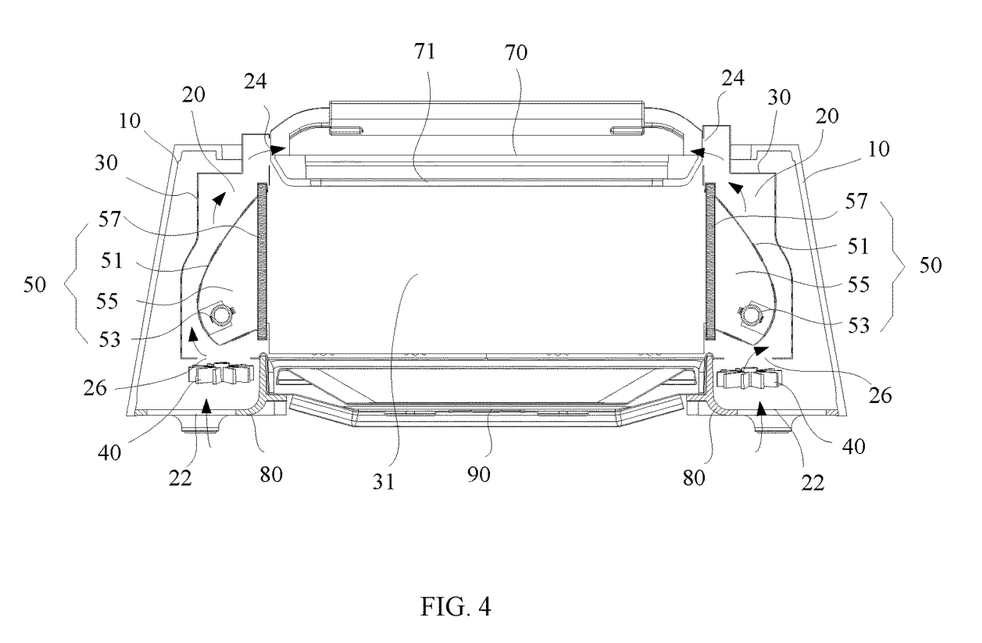
FIG. 4 is a cross sectional diagram of the electric roasting machine shown in FIG. 1.

In the exemplary embodiment, the vertical height of the carrying part 71 from the opening of the cavity 31 is in a range of 30 millimeters to 150 millimeters. Because in the heating process of the electric roasting machine, the food material itself has a certain height, the sinking distance of the carrying part 71 in the exemplary embodiment is configured to be in the range of 30 millimeters to 150 millimeters. As such, the electric roasting machine 100 can have a compact and beautiful overall structure, and the food material on the carrying part 71 can be entirely in the region that thermal radiation of the heating device 50 covers, so that the heating efficiency is improved.

In the exemplary embodiment, the heating device 50 is installed in the inner housing 30. The top end of the air passage 20 enclosed by the inner housing 30 and the heating device 50 is closed. Specifically, the inner housing 30 bends inwards to form the top-closed air passage 20 together with the heating device 50. The side of the air passage 20 close to the cavity 31 includes the air outlet 24.

In the present disclosure, the housing of the electric roasting machine 100 forms the cavity 31, the heating device 50 is arranged in the cavity 31, and the heating device 50 and the housing cooperatively form the air passage 20, and the wall of the cavity 31 of the housing also has the air outlet 24 in communication with the air passage 20. During the use of the electric roasting machine 100, the carrying part 71 of the grill 70 is sunk into the cavity 31 and is arranged to be below the plane of the air outlet 24, so that part of the heat generated by the heating device 50 radiates to the grill 70 from bottom to top, to heat of the lower part of the food on the grill 70, and the other part of the heat can heat the air in the air passage 20 to form flowing hot air, and the hot air is blown to the side part of the food on the grill 70 through the air outlet 24, thus the upper part and the lower part of the food on the grill 70 can be simultaneously heated. As such, the efficiency and effect of heating the food are improved, and the heat utilization rate of the electric roasting machine 100 is improved.

In the exemplary embodiment, the bottom housing 80 is connected to the lower ends of the outer housing 10 and the inner housing 30, the bottom housing 80 includes an air inlet 22, and the bottom of the inner housing 30 includes a through hole 26 communicating with the air passage 20 and the air inlet 22. By arranging the air inlet 22 at the bottom of the electric roasting machine 100, external cold air can flow into the air passage 20 from the lower end of the electric roasting machine 100, and the air inlet 22 is not easily blocked by dropped food materials during the use of the electric roasting machine.

Furthermore, referring to FIG. 4 again, in one exemplary embodiment, an electric fan 40 may be disposed between the air inlet 22 and the through hole 26 of the electric roasting machine 100. The electric fan 40 of the exemplary embodiment is located between the bottom housing 80 and the inner housing 30. After the electric fan 40 is started, the external air is driven to enter into the air passage 20 through the air inlet 22, the electric fan 40, and the through hole 26, and then the external air is blown to the food on the grill 70 through the air outlet 24. Through the arrangement of the electric fan 40, the air in the air passage 20 can flow faster, and the heat, which is radiated by the heating device 50 towards the outer housing 10, can be more rapidly absorbed by the wind in the air passage 20, to form hot air which can be blown to the upper part of the food through the air outlet 24. Thus, the heat utilization rate of the electric roasting machine 100 is higher, and the heating efficiency is improved. It can be understood that through the cooperation of the electric fan 40 and the air passage 20, after the use of the electric roasting machine 100 is finished, the electric fan 40 can continuously operate for a period of time to realize rapid heat dissipation and cooling of the electric roasting machine 100, which is convenient for subsequent cleaning and transportation and makes the electric roasting machine 100 more convenient to use.

In the exemplary embodiment, a plurality of air outlets 24 are arranged in rows, and the air outlets 24 in each row are linearly arranged and are in the same horizontal plane. In this way, the hot air blown out from the air outlet 24 is more uniform and the heating efficiency is improved.

There are two heating devices 50 in the present disclosure. The two heating devices 50 are arranged in the cavity 31 and opposite to each other, and each heating device 50 extends along the length direction of the inner housing 30.

The electric roasting machine 100 of the present disclosure includes two heating devices 50 which are arranged to be opposite to each other. On the one hand, the opposite sides of the food material on the grill 70 can be heated simultaneously, so that the food material can be heated uniformly, and the finished food products after being baked are of excellent quality. On the other hand, the heating efficiency of the food material is improved.

The electric roasting machine 100 also includes two air passages 20 corresponding to the heating devices 50. Further, the inner housing 30 includes the plurality of air outlets 24 arranged linearly above each heating device 50. That is, the electric roasting machine 100 includes two rows of air outlets 24 which are oppositely arranged, so that both sides of the upper part of the food on the grill 70 can be heated simultaneously, and the heating efficiency is improved.

Referring to FIG. 4, the heating device 50 of the electric roasting machine 100 of the present disclosure includes a reflecting cover 51 and a radiant heat source 53 mounted at the reflecting cover 51. The reflecting cover 51 defines a reflecting cavity 55, the radiant heat source 53 is located in the reflecting cavity 55, the periphery of the reflecting cover 51 abuts against the inner housing 30, and the inner housing 30 and the outer wall of the side of the reflecting cover 51 away from the radiant heat source 53 cooperatively form the air passage 20. The distance between the carrying part 71 and the radiant heat source 53 is smaller than the distance between the top end of the reflecting cover 51 and the carrying part 71.

The radiant heat source 53 of the heating device 50 of the present disclosure is an infrared lamp tube. The cavity path of the reflecting cavity 55 formed by the reflecting cover 51 inclines upwards, and the upper part of the reflecting cavity 55 is provided with an avoiding opening (not labelled), so that most of the heat radiated by the radiant heat source 53 can be guided to the grill 70 located at the upper end of the inner housing 30, to heat the food on the grill 70 in a non-contact mode. The reflecting cover 51 may include a base made of metal material (such as aluminum alloy) and a reflecting material layer (such as a galvanized layer) covering the surface of one side of the base facing the radiant heat source 53. The reflecting cover 51 may have an integrated plate structure, and can be formed through bending, or the reflecting cover 51 can be formed by splicing a plurality of plates together. The radiant heat source 53 of the exemplary embodiment may be replaced by a halogen lamp, a coil type filament, a ceramic heater, or the like.

According to the technical solution of the present disclosure, the air passage 20 is formed between the reflecting cover 51 and the inner housing 30, so that the structure is compact and simple, and, meanwhile, the heat reflected by the reflecting cover 51 towards the outer housing 10 can be effectively utilized, and the heat utilization rate of the electric roasting machine 100 is improved. Since the carrying part 71 is located in the height area where the reflecting cover 51 is located, and the distance (horizontal distance) between the carrying part 71 and the radiant heat source 53 is smaller than the distance (vertical distance) between the top end of the reflecting cover 51 and the carrying part 71. Then the heat generated by the radiant heat source 53 partially passes through the grid holes each formed between two adjacent grid bars (not labelled) of the carrying part 71, to heat the lower surface of the food materials, so that the heating efficiency of the electric roasting machine 100 is significantly improved. Furthermore, the width of each grid bar of the carrying part 71 of the present disclosure is greater than 5 millimeters, and less than or equal to 10 millimeters. By setting the width of the grill bar of the grill 70 to be greater than 5 millimeters, the grill bar of the grill 70 can have sufficient bending strength to support the food to be baked, thereby preventing the grill bar of the grill 70 from being deformed and damaged due to the gravity of the food and also preventing the food from falling into the housing and being polluted. In addition, by setting the width of the grill bar of the grill 70 to be less than or equal to 10 millimeters, the areas covered by the grill bars can be rationalized, so that the portions of the food covered by the grill bars can still be rapidly heated by heat directly transmitted from both sides of the grill bars, the reduction of the roasting efficiency caused by wide grill bars is avoided, and the roasting efficiency of the electric roasting machine is improved.

Furthermore, the ratio of the width of each grid bar to the distance between two adjacent grid bars ranges from 1 to 10. Specifically, the density of the plurality of grid bars can be reasonably adjusted according to specific use requirements. In this way, the density of the grid bars can be reasonably optimized to meet the support requirements of different types of food, so that the roasting process of the electric roasting machine 100 can be more reasonable and effective, and the use experience is further improved.

The thickness of each grid bar on the carrying part 71 of the present disclosure ranges from 1 millimeter to 6 millimeters. As the grid bars are generally made of metal materials which are excellent conductors of heat. Therefore, with such thickness setting, the heat received at the bottom of the grill bars can be quickly transferred to the food through the grill bars, to heat the portions of the food shielded by the grill bars, thus further improving the roasting efficiency of the electric roasting machine 100.

Furthermore, the ratio of a vertical distance between the carrying part 71 and the lower end of the reflecting cover 51 to the height of the reflecting cover 51 ranges from 0.1 to 0.9. In this way, it can be further ensured that food materials with different thicknesses on the carrying part 71 can be within the heat range of the radiant heat source 53, and the heating efficiency is improved.

In order to further reduce the heat radiated by the heating device 50 towards the outer housing 10, and further improve the heating efficiency of the electric roasting machine 100, in the exemplary embodiment, the surface of the inner housing 30 facing the reflecting cover 51 is coated with a reflecting layer (not labelled), and the reflecting layer is a zinc-plated layer or an aluminum-plated layer.

By coating a reflecting layer on the surface of the inner housing 30 facing the reflecting cover 51, the heat radiated by the heating device 50 towards the outer housing 10 can be reflected back by the inner housing 30, which is equivalent to adding another reflecting cover, thus the heat loss is further reduced and the heating efficiency of the electric roasting machine 100 is further improved.

Figure 5:
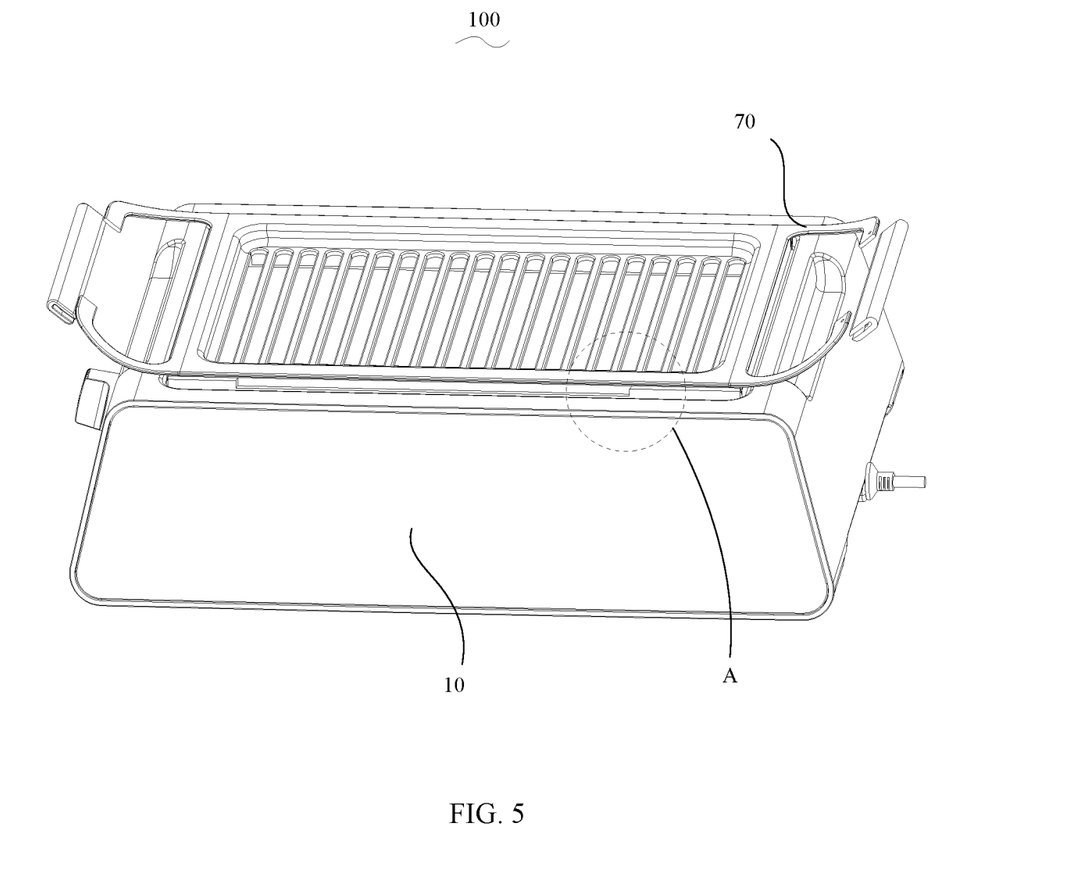
FIG. 5 is a structural diagram of the electric roasting machine of the present disclosure according to a second exemplary embodiment.
Figure 6:
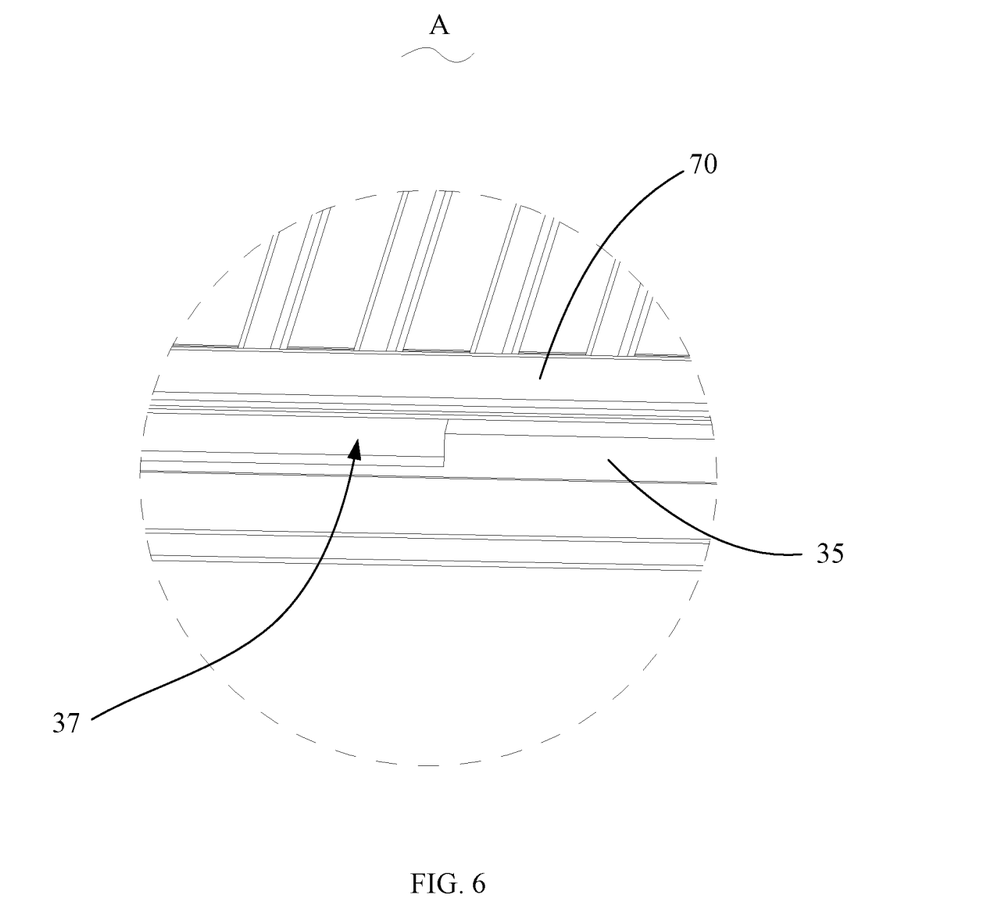
FIG. 6 is an enlarged diagram of portion A shown in FIG. 5.

Furthermore, referring to FIGS. 5 and 6, in order to reduce the temperature of the outer housing 10, in one exemplary embodiment, the inner housing 30 also includes a supporting part 35 at the opening of the cavity 31, and the upper end surface of the supporting part 35 is higher than that of the outer housing 10.

According to the technical solution of the present disclosure, as the upper end surface of the supporting parts 35 is arranged higher than the upper end surface of the outer housing 10, the side edge of the grill 70 is higher than the outer housing 10 when the grill 70 of the electric roasting machine 100 is located on the supporting parts 35, so that even if the grill 70 deviates relatively greatly in the roasting process, the side edge of the grill 70 cannot contact the outer housing 10, thereby the outer housing 10 of the electric roasting machine 100 is effectively prevented from being scalded by the high temperature of the grill 70 and the structural integrity of the electric roasting machine 100 is ensured.

There are a plurality of supporting parts 35 which are arranged at intervals and surround the opening of the cavity 31, and each two adjacent supporting parts 35 define one airflow channel 37 therebetween.

Specifically, in the exemplary embodiment, since the opening of the cavity 31 is substantially rectangular in shape, there are four supporting part 35 distributed at the four corners of the opening of the cavity 31, to support the four corners of the grill 70 and increase the stability and safety of the grill 70 located at the supporting part 35. In addition, the two adjacent supporting parts 35 are separated from each other and cooperatively form one airflow channel 37, to facilitate the discharge of the hot air with smoke generated in the inner housing 30. In addition, the manufacture materials are saved and the cost are further reduced through arrangement of the supporting parts 35.

The heating device 50 of the electric roasting machine 100 of the present disclosure further includes a protecting window 57, which is configured to cover the avoiding opening and forms a closed space together with the reflecting cover 51.

The protective window 57 is preferably made of glass. On the one hand, the protecting window 57 can filter the light emitted by the radiant heat source 53 (e.g., ultraviolet rays), to reduce the harm of the harmful light emitted by the radiant heat source 53 and improve the safety of the electric roasting machine 100. On the other hand, the protecting window 57 and the reflecting cover 51 cooperatively form a closed space, and the radiant heat source 53 is located in the closed environment. During the food heating process, oil drops or moisture dropping onto the oil drip pan 90 would not splash onto the radiant heat source 53, thus the corrosion of the radiant heat source 53 by the oil drops or moisture is avoided and the service life of the electric roasting machine 100 is improved.

Furthermore, referring to FIG. 4, in one exemplary embodiment, the protecting window 57 vertically extends along the up-down direction. Alternatively, referring to FIG. 9, in another exemplary embodiment, the protecting window 57 extends obliquely along a direction from the lower end of the housing to the upper end of the housing and tilting towards the center point of the opening of the cavity 31.

Figure 9:
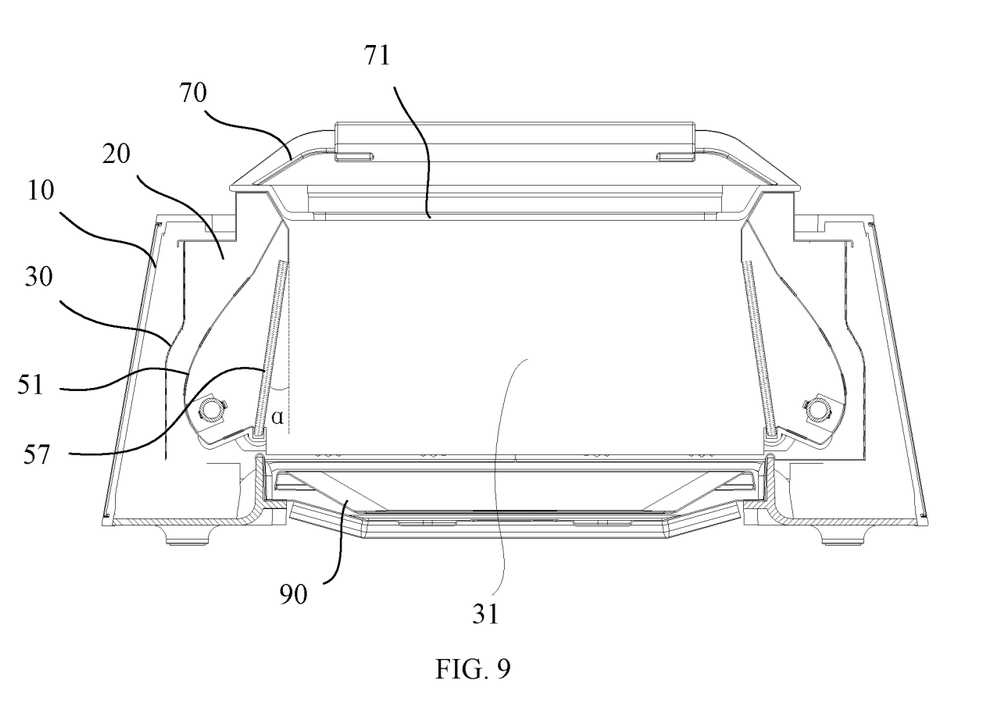
FIG. 9 is a cross sectional diagram of the electric roasting machine of the present disclosure according to a fourth exemplary embodiment.

The present disclosure can prevent oil droplets or other sundries from polluting the radiant heat source by the protecting window 57. That is, oil droplets are prevented from entering the reflecting cavity 55 through the avoiding opening, for improving the efficiency of grilling food. Further, the protecting window 57 is configured to extend vertically along the up-down direction, or the protecting window 57 is configured to extend obliquely along a direction from the lower end of the housing to the upper end of the housing and tilting towards the center point of the cavity 31, thus even if the oil droplets splash on the protecting window 57, the oil droplets can drop to the oil drip pan 90 in the first time due to the gravity of the oil droplets themselves, or the oil droplets can quickly slide down to the oil drip pan 90 through the protecting window 57 due to the gravity of the oil droplets themselves. Therefore, oil droplets on the protecting window 57 can be prevented from blocking the emission of radiant energy, and the roasting efficiency is improved.

Referring to FIG. 9, in the exemplary embodiment, the protecting window 57 is arranged obliquely, an angle α between the protecting window 57 and the normal line of the horizontal plane is greater than 0 degree, and less than or equal to 20 degree.

In this way, the installation space of the protecting window 57 can be saved. When a is equal to 20 degree, the protecting window 57 is inclined so that oil droplets or other impurities can fall off due to their own gravity or slide down along the inclined surface. An anti-fouling coating, such as an oleophobic coating, can be further provided on the surface of the protecting window 57 away from the radiant heat source 53, to accelerate the sliding of oil droplets. Of course, it can be understood that the antifouling coating also has high light transmittance, for allowing the radiant heat to pass through.

Furthermore, the orthographic projection of the protecting window 57 on the horizontal plane is configured to be not overlapping with the orthographic projection of the carrying part 71 on the horizontal plane.

During the roasting, the oil drops fall from the carrying part 71, as the projections of the protecting window 57 and the carrying part 71 on the horizontal plane are staggered from each other, the oil would not drop on the protecting window 57, and the food dropped from the carrying part 71 can directly fall on the oil drip pan 90, and the food would not or is not easy to fall on the protecting window 57, so that the protecting window 57 is kept clean, and the heating efficiency is ensured.

Figure 10:
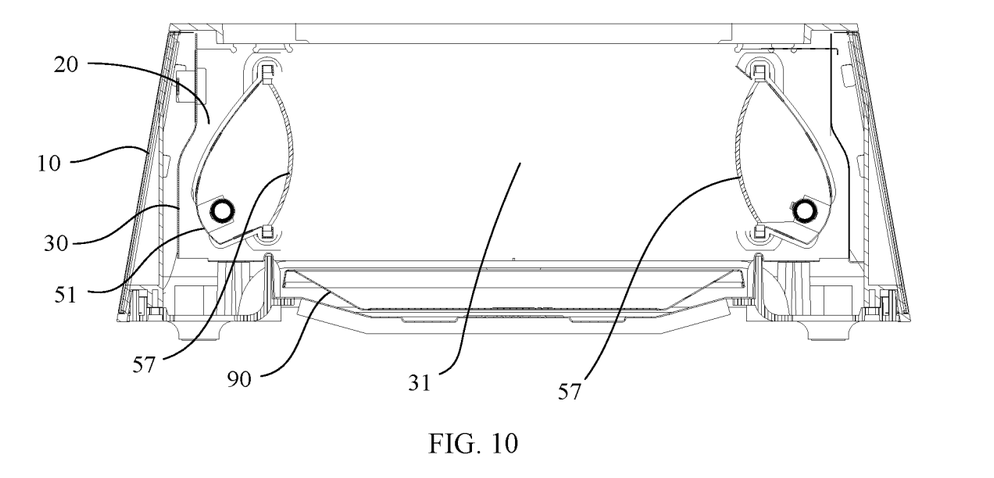
FIG. 10 is a cross sectional diagram of the electric roasting machine of the present disclosure according to a fifth exemplary embodiment, with the grill in an uninstalled state.

Referring to FIG. 10, in another exemplary embodiment, the protecting window 57 is a curved plate. As the protecting window 57 is arranged as the curved plate, when light passes through the curved plate, the refraction of the light can be reduced, so that more heat can be transferred to the carrying part 71, and the roasting efficiency is improved.

Furthermore, the curved plate of the protecting window 57 protrudes towards the grill 70. It can be understood that the perpendicularly incident light has the minimum refraction. As the curved surface of the protecting window 57 is arranged to protrude towards the grill 70, the light gathering ability can be further enhanced, for heating food fast.

In the exemplary embodiment, the curved plate is formed by one single curve plate, and a curve radius of the single curved plate is in a range of 30 millimeters to 120 millimeters. When the curved plate is made by one single curve plate, the manufacturing process is relatively easy. The curve radius of 30 millimeters to 120 millimeters is more favorable for light to irradiate the grill 70, thereby improving heating efficiency. In some other embodiments, the curved plate can be formed by connecting a plurality of curved plates with different curve radii. As the curved plates with different curve radii have different refractions, the heating intensity of each region can be adjusted, and the heat on each region of first avoiding opening can be adjusted to be more uniform. In this way, the curved plates can enhance the light gathering ability.

Figure 7:
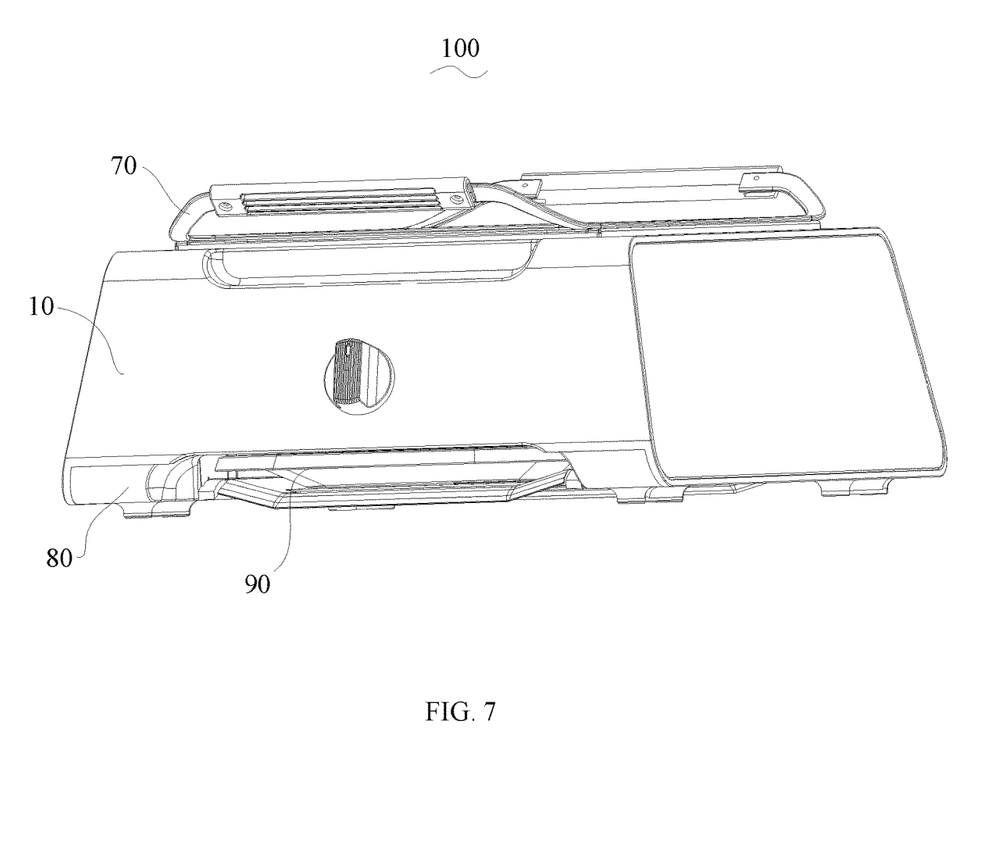
FIG. 7 is a structural diagram of the electric roasting machine of the present disclosure according to a third exemplary embodiment.
Figure 8:
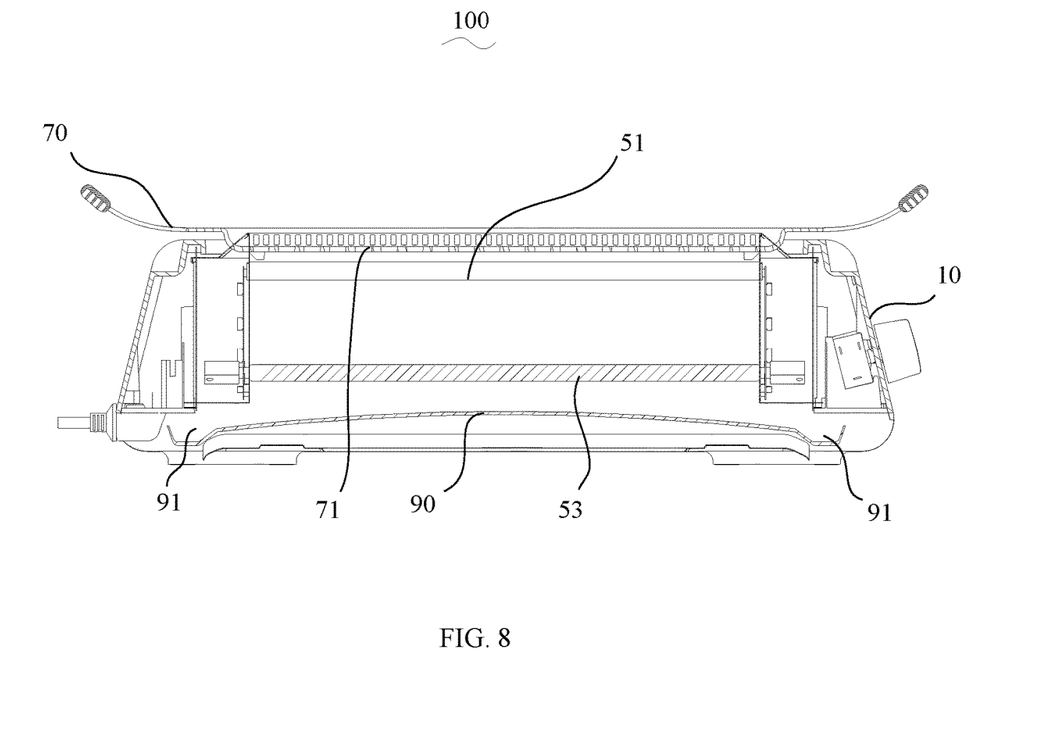
FIG. 8 is a longitudinal sectional diagram of the electric roasting machine shown in FIG. 7.

Referring to FIGS. 7 and 8, in one exemplary embodiment, in order to improve the oil receiving effect of the oil drip pan 90, at least one end of the oil drip pan 90 includes a concave oil receiving groove 91, the length of the projection of the oil drip pan 90 on the horizontal plane is greater than the length of the projection of the heating device 50 on the horizontal plane, and the orthographic projection of the oil receiving groove 91 is located outside the orthographic projection area of the heating device 50.

In the exemplary embodiment, the length of the projection of the oil drip pan 90 on the horizontal plane is greater than the length of the projection of the heating device 50, and the orthographic projection of the oil receiving groove 91 is located outside the orthographic projection area of the heating device 50. In this way, oil droplets, moisture and the like dropped from food on the grill 70 can directly fall on the oil drip pan 90, and the oil drops in the oil receiving groove 91 would not be heated by the heat from the heating device 50, thereby generation of oil smoke from the electric roasting machine 100 is reduced. The oil drip pan 90 is slidably connected with the bottom housing 80, both sides of the bottom housing 80 can each include a sliding groove, the peripheries of both sides of the oil drip pan 90 can be embedded in the sliding grooves respectively, and the bottom of the outer housing 10 includes a notch, the end part of the oil drip pan 90 is positioned at the notch, and the end part of the oil drip pan 90 can be put in or pulled out of the cavity 31 through manual pushing and pulling, so that the cleaning operation of the electric roasting machine 100 is simple and convenient.

Furthermore, in one exemplary embodiment, the oil drip pan 90 of the present disclosure can protrude towards the middle, and form two inclined surfaces (not labelled) extending from the middle to both ends respectively, and each inclined surface is coupled to one oil receiving groove 91.

That is, the oil receiving grooves 91 are formed at both sides of the heating device 50 along the extending direction of the heating device 50. Cold regions are also formed at both sides of the heating device 50, which can prevent oil droplets from being heated by the heating device 50 in the process of sliding down to the oil receiving grooves 91, and can also enable the oil drip pan 90 to store more oil droplets.

It can be understood that, in some other exemplary embodiments, the oil drip pan 90 can also include one inclined surface and one oil receiving groove 91.

The foregoing description merely depicts some embodiments of the present disclosure and therefore is not intended to limit the scope of the present disclosure. An equivalent structural changes made by using the content of the specification and drawings of the present disclosure, or any direct or indirect application of the disclosure in any other related fields shall all fall in the scope of the present disclosure.

What is claimed is:

1. An electric roasting machine comprising:
 a housing defining a cavity having an upper opening, the housing including an inner housing and an outer housing sleeved on the inner housing, and the inner housing including an inclined surface at an upper end of the inner housing;
 a heating device installed in the cavity and including:
  a reflecting cover connected to the housing, an inner wall of the reflecting cover forming a reflecting cavity, and a periphery of the reflecting cover abutting against the inclined surface of the inner housing;
  a radiant heat source mounted at the reflecting cover and located in the reflecting cavity; and
  a protecting window extending along a direction from a lower end of the housing to an upper end of the housing, an upper end of the protecting window being closer to a vertical center plane of the housing than a lower end of the protecting window; and
 a grill located at the opening of the cavity, the grill comprising a carrying part extending into the cavity and located in a region covered by thermal radiation of the heating device, and the grill extending into the cavity along the inclined surface;
 wherein:
  the inner housing and an outer wall of the reflecting cover facing away from the radiant heat source cooperatively form an air passage between the inner housing and the outer wall of the reflecting cover;
  a wall of the air passage facing the opening of the cavity includes an air outlet communicating with the air passage; and
  a plane at which the carrying part is located is lower than the air outlet.

2. The electric roasting machine according to claim 1, wherein a vertical distance of the carrying part from the opening is in a range from 30 millimeters to 150 millimeters.

3. The electric roasting machine according to claim 1, wherein:
 the heating device is installed in the inner housing; and
 a top end of the air passage is closed, and a side of the air passage near the cavity includes the air outlet.

4. The electric roasting machine according to claim 1, wherein:
 the inner housing bends inwards; and
 the air outlet is one of a plurality of air outlets of the inner housing that are linearly arranged above the heating device.

5. The electric roasting machine according to claim 4, wherein the plurality of air outlets are in a same horizontal plane.

6. The electric roasting machine according to claim 1, wherein the inner housing includes a supporting part configured to support the grill at the opening of the cavity, and an upper end surface of the supporting part is higher than an upper end surface of the outer housing.

7. The electric roasting machine according to claim 6, wherein the supporting part is one of a plurality of supporting parts of the inner housing that are arranged at intervals and surround the opening of the cavity, each two adjacent ones of the supporting parts defining one airflow channel.

8. The electric roasting machine according to claim 1, wherein:
the housing further comprises a bottom housing connected to lower ends of the outer housing and the inner housing, the bottom housing including an air inlet; and
a bottom of the inner housing includes a through hole communicating with the air passage and the air inlet.

9. The electric roasting machine according to claim 8, further comprising:
an electric fan arranged between the air inlet and the through hole, the electric fan being configured to drive external air to enter the air passage through the air inlet, the electric fan, and the through hole, to cause the external air to form hot air to be blown to an upper part of an object on the grill through the air outlet, and the hot air being formed by the external air in the air passage absorbing heat radiated by the heating device towards the outer housing.

10. The electric roasting machine according to claim 8, further comprising:
an oil drip pan arranged at the bottom housing, one end of the oil drip pan including a concave oil receiving groove;
wherein:
a length of a projection of the oil drip pan on a horizontal plane is greater than a length of a projection of the heating device on the horizontal plane; and
an orthographic projection of the oil receiving groove is located outside an area of an orthographic projection of the heating device.

11. The electric roasting machine according to claim 1, wherein:
the reflecting cover is connected to the inner housing; and
a distance between the carrying part and the radiant heat source is smaller than a distance between a top end of the reflecting cover and the carrying part.

12. The electric roasting machine according to claim 11, wherein a ratio of a vertical distance between the carrying part and a lower end of the reflecting cover to a height of the reflecting cover is in a range from 0.1 to 0.9.

13. The electric roasting machine according to claim 11, wherein the carrying part includes a plurality of grid bars arranged at intervals, and each of the grid bars has a width greater than 5 millimeters and less than or equal to 10 millimeters.

14. The electric roasting machine according to claim 13, wherein a ratio of the width of each of the grid bars to a distance between two adjacent ones of the grid bars ranges from 1 to 10.

15. The electric roasting machine according to claim 11, wherein:
the reflecting cavity includes an avoiding opening;
the protecting window is configured to cover the avoiding opening; and
the protecting window and the reflecting cover enclose a closed space.

16. The electric roasting machine of claim 15, wherein an orthographic projection of the protecting window on a horizontal plane is configured to be not overlapping with an orthographic projection of the carrying part on the horizontal plane.

17. The electric roasting machine of claim 15, wherein the protecting window includes a curved plate protruding towards the grill.

18. The electric roasting machine of claim 1, wherein the air outlet is formed at the inclined surface of the inner housing.

19. The electric roasting machine of claim 1, wherein the upper end of the protecting window is coplanar with an end of a bottom surface of the carrying part in a vertical direction.

20. An electric roasting machine comprising:
a housing defining a cavity having an upper opening;
a first heating device installed in the cavity and including:
a reflecting cover connected to the housing;
a radiant heat source mounted at the reflecting cover; and
a first protecting window extending along a direction from a first lower end of the housing to a first upper end of the housing;
a second heating device located in the cavity and opposite to the first heating device, and including a second protecting window extending along a direction from a second lower end of the housing to a second upper end of the housing; and
a grill located at the opening of the cavity, the grill comprising a carrying part extending into the cavity and located in a region covered by thermal radiation of the first heating device and the second heating device;
wherein:
a distance between an upper end of the first protecting window and an upper end of the second protecting window is smaller than a distance between a lower end of the first protecting window and a lower end of the second protecting window; and
the upper end of the first protecting window is coplanar with a first end of a bottom surface of the carrying part in a vertical direction, and the upper end of the second protecting window is coplanar with a second end of the bottom surface of the carrying part in the vertical direction.

* * * * *